Figure 1:
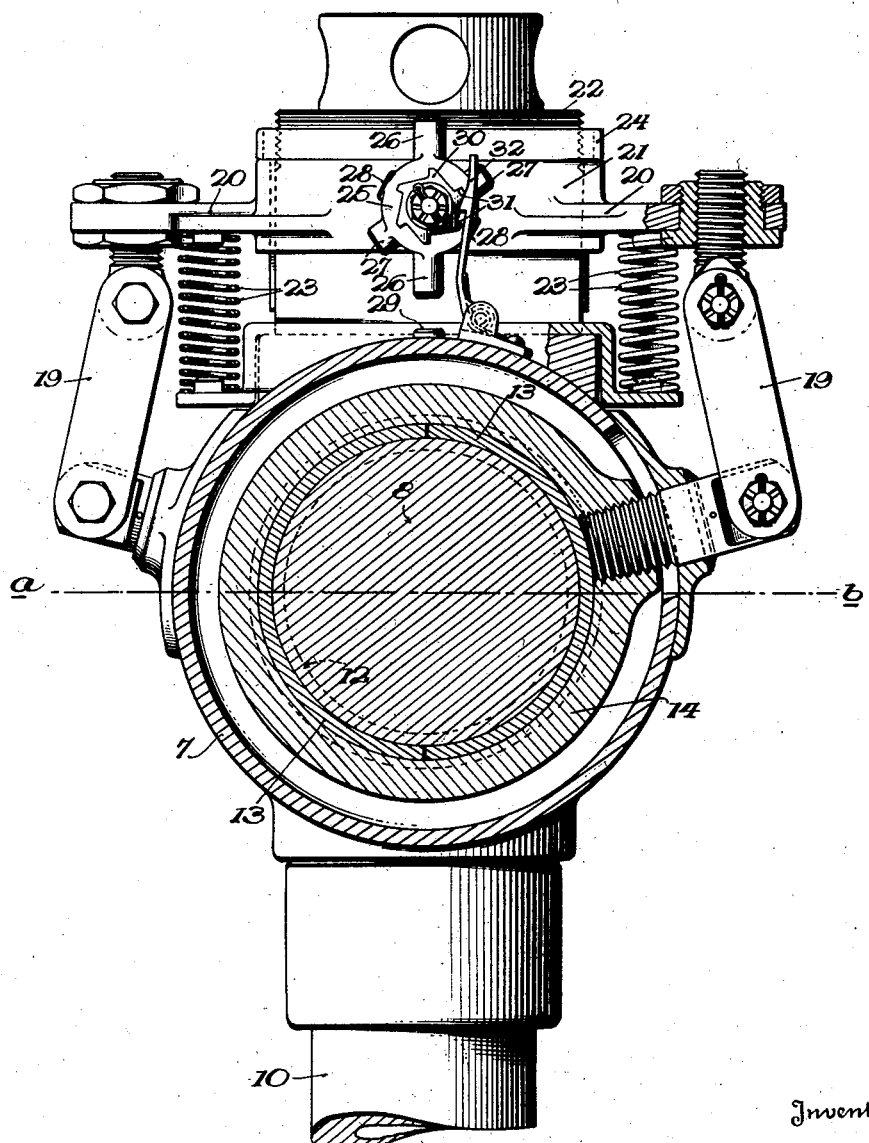

April 14, 1936.   M. MANSSON   2,037,251
PROPELLER
Filed Oct. 6, 1933   3 Sheets-Sheet 1

Inventor
Martin Mansson
By N. W. Parson
Attorney

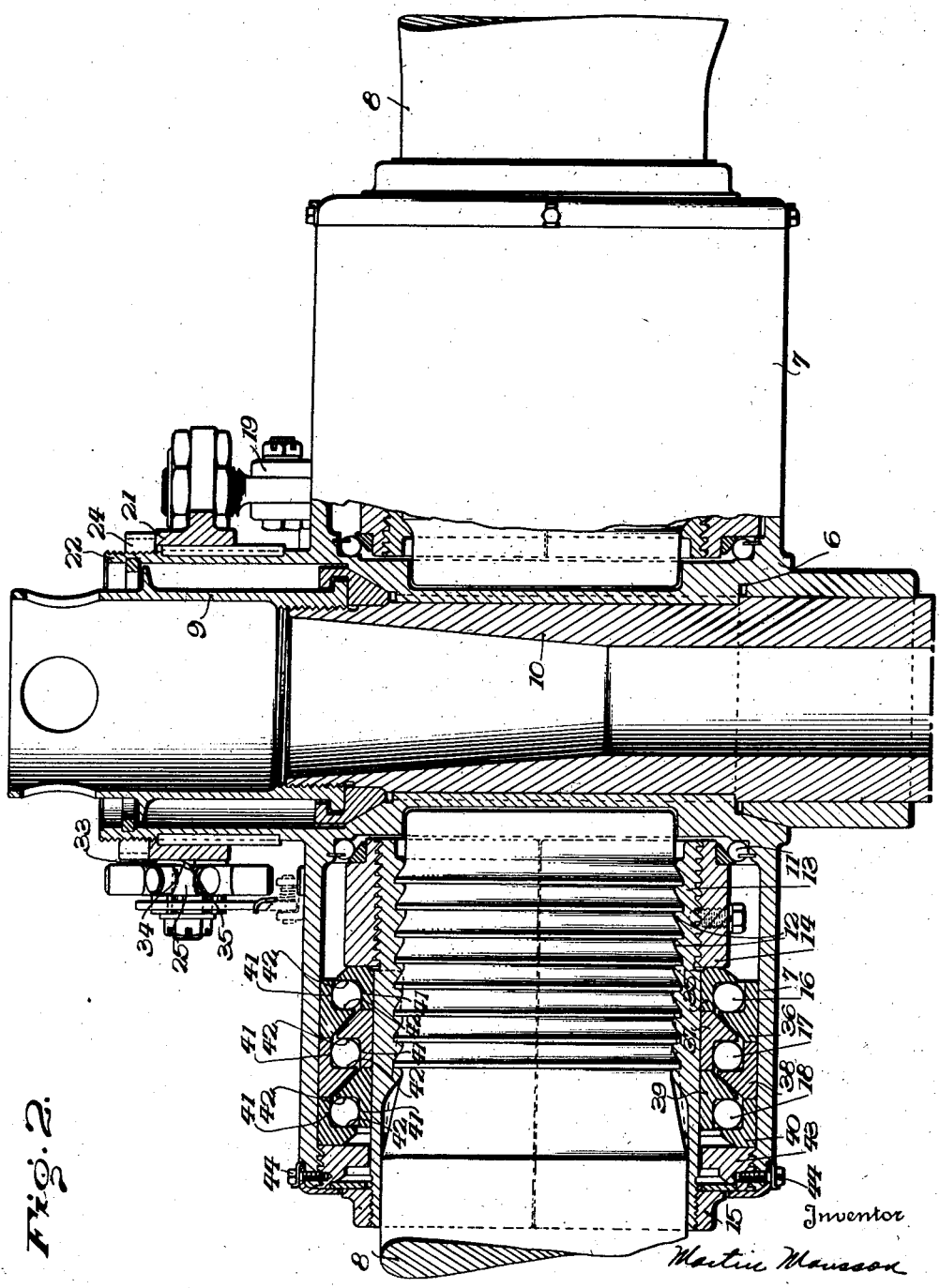

April 14, 1936.  M. MANSSON  2,037,251
PROPELLER
Filed Oct. 6, 1933   3 Sheets-Sheet 3

Inventor
Martin Mansson
By
N. D. Parker Jr.
Attorney

Patented Apr. 14, 1936

2,037,251

UNITED STATES PATENT OFFICE 2,037,251

PROPELLER

Martin Mansson, East Orange, N. J., assignor to Eclipse Aviation Corporation, East Orange, N. J., a corporation of New Jersey Application October 6, 1933, Serial No. 692,537

6 Claims. (Cl. 170—162)

This invention relates to propellers and more particularly to propellers of the variable pitch type which are especially adaptable for use on aircraft.

One of the objects of the present invention is to provide a novel variable pitch propeller wherein the forces inherent in the propeller during operation thereof are employed for varying the pitch of the blades.

Another object of the invention is to provide a novel operator-controlled selectively-operable pitch limiting mechanism for a variable pitch propeller whereby the operator may, by a relatively simple operation, effect a change in the limits of the pitch variation of the blades, during operation of the propeller.

Still another object is to provide a variable pitch propeller wherein the centrifugal torsion of the propeller blades is employed in a novel manner for varying the pitch of the propeller blades.

A further object is to provide in a torsion-operated variable pitch propeller of the above character, a novel self-adjusting mechanism for variably limiting the reduction in the pitch of the propeller blades whereby the operator may, by merely effecting a change in the speed of rotation of the propeller, readily change the limits of pitch adjustment in order to secure the most efficient operation of the propeller during different conditions encountered during flight.

Another object is to provide a novel blade mounting for a variable pitch propeller permitting the use of blades of light-weight metal, which mounting will effectively secure the blades in the hub without increasing the size of the blade roots nor of the hub sockets.

Still another object is to provide a novel thrust bearing structure for a variable pitch propeller blade mounting, so constructed as to be unusually compact in its assembly and capable of withstanding the unusually high thrust forces of the blades due to centrifugal action during operation.

A still further object is to provide a novel method of preparing and assembling a plurality of thrust bearings for utilization in a variable pitch propeller blade mounting which will insure the proper distribution of the thrust load of the propeller blade due to the effects of centrifugal force thereon.

Other objects and novel features of the invention will appear more fully hereinafter from the following detailed description when taken in connection with the accompanying drawings. It is to be expressly understood, however, that the drawings are for purposes of illustration only and are not designed as a definition of the limits of the invention, reference being had for such purpose to the appended claims.

Figure 5:
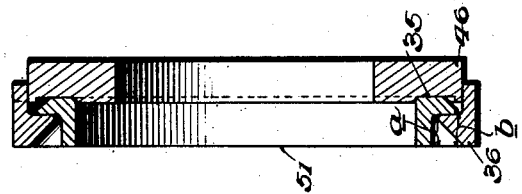
Figure 4:
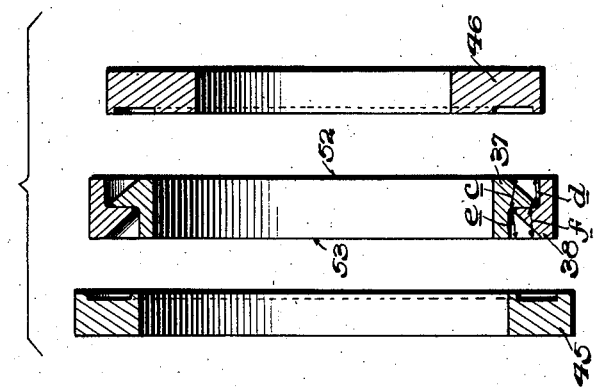
Figure 3:
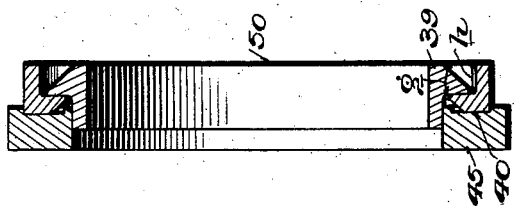

In the drawings, wherein similar reference characters refer to similar parts through the several views, Fig. 1 is a side view, partly in section, of a variable pitch propeller constructed in accordance with the present invention;

Fig. 2 is an axial view, partly in section, of the propeller shown in Fig. 1 and illustrating the blade mounting and thrust bearing construction therefor; and Figs. 3, 4 and 5 are views illustrating the manner in which the bearing races of the blade thrust bearings are fitted prior to assembly in the hub to insure proper distribution of the thrust load.

Referring more particularly to Figs. 1 and 2, a propeller constructed in accordance with the present invention is illustrated therein as being constituted by a hub 6 provided with a pair of radially-extending sockets 7 adapted to receive the root ends of propeller blades 8, the hub and blade assembly being suitably secured, as by means of a retaining nut 9, to a power driven shaft 10, which latter may be an extension of an engine crankshaft.

In order to rotatably mount each blade in its respective socket, there is provided a suitable bearing 11 positioned adjacent the extreme inner end portions of the blades. Preferably, the latter are made of light-weight metal, such as for example an aluminum alloy, and in order to provide a secure and rigid mounting for the blades, the root ends of the latter are formed with a series of annular grooves or ridges 12 positioned relatively close together and cooperating with similar grooves or ridges formed upon the interior surface of a split sleeve 13. The latter firmly grips the blade root by reason of being compressed therearound by threaded locking rings 14 and 15. Interposed between the rings 14 and 15 are a series of ball thrust bearings 16, 17 and 18 forming an efficient means for withstanding the outward thrust of the blades due to centrifugal force and constituting an important feature of the present invention to be referred to hereinafter more in detail.

Means are provided for rotating the blades in the hub sockets to vary the blade pitch and, as shown, such means are automatically operable in accordance with the variation in the centrifugal torsion of the blades. As is well known in the art, the action of centrifugal force upon each mass of material in a blade section tends to effect a turning of the blade into the plane of rotation, that is tends to reduce the blade pitch. This effect is usually termed centrifugal torsion and is proportional to the square of the rate of revolutions of the propeller. In the construction of the present invention, Fig. 1, the blade 8 under the influence of centrifugal torsion reduces its pitch by tending to turn into the plane of rotation $a$—$b$.
Such change in pitch is permitted by means of link mechanisms 19 secured respectively to each blade and to arms 20 of collar 21 slidably secured to an extension 22 of the hub 6, the collar 21 being yieldably urged, by means of suitable resilient means such as springs 23, against a stop ring 24 adjustably threaded to the forward portion of the extension 22. From this construction, it will be observed that the resilient means 23 normally maintains the collar 21 against the stop 24 whereby the pitch of the blades will be a maximum. This maximum pitch, however, may be readily varied by adjustment of the ring 24. It will also be apparent that centrifugal torsion on the blades will tend to reduce the pitch of the latter, moving collar 21 downwardly, as viewed in Fig. 1, through the link mechanisms 19, and compressing springs 23 until a condition of equilibrium is reached. Since the effect of torsion is proportional to the square of the rate of revolutions of the propeller, it will be appreciated that the reduction in pitch may be readily controlled by the adjustment of the engine throttle by the operator to thereby control the speed of the engine.

Positive stop means are preferably provided for variably limiting the reduction in the pitch of the propeller blades, and such stop means are adjusted during increase in the pitch of the blades. As shown, such means may be readily controlled by the operator by varying the engine throttle. Referring more particularly to Figs. 1 and 2, the above referred to stop means are constituted by stop members 25, one for each hub socket, rotatably mounted in any suitable manner upon diametrically opposite sides of the collar 21.
Each stop member is preferably provided with three pairs of opposed stops 26, 27 and 28 of variable length respectively, each of said stops being adapted to cooperate with a stop 29 secured to the hub socket. In order that each stop member may be adjusted by relative movement between the collar 21 and the hub, a suitable pawl and ratchet mechanism is provided, comprising a ratchet 30 carried by each stop and having a plurality of ratchet faces 31 adapted to be engaged by pawl 32 carried by each hub socket. A spring detent 33, Fig. 2, secured to the collar 21 and having a detent end 34 adapted to engage suitable notches 35 in the stop members is provided for maintaining the latter in a selected position during movement of the collar 21 toward the hub, but permitting movement of the stop members by the pawls 32 during movement of the collar away from the hub to adjust the stop.

From the above construction, it will be apparent that the stop members 25 are readily adjusted by the operator by controlling the speed of the propeller, in order to variably limit the reduction in the pitch of the blades to secure the most efficient operation of the propeller during variable flight conditions. For example, during take-off, where a low blade angle yields maximum engine and propeller efficiency, the members 25 are so adjusted as to bring stops 28 into registry with stops 29. The collar 21 is thus capable of moving a maximum distance toward the hub in accordance with the torsion responsive movement of links 19, the propeller blades under these conditions turning through a maximum angle providing the speed of rotation is sufficiently great that the torsion of the blades will fully compress springs 23 to effect abutting engagement between stops 28 and 29. As soon as the aircraft has taken off, the speed of rotation of the propeller decreases, thereby decreasing the torsional moment of the blades, the spring 23 then being effective to move the collar 21 forwardly to increase the pitch until the spring pressure balances the torsional moment of the blades for the particular speed of rotation of the propeller.

During forward movement of the collar 21, the stop 25 is adjusted to a new position by reason of the engagement of the next successive ratchet face 31 with the stationary pawl, the stop 25 under these conditions being rotated in a clockwise direction, as viewed in Fig. 1, to align stops 27 and 29. The parts are preferably so adjusted that for a propeller which has a normal speed of two thousand revolutions per minute, a reduction in the speed to approximately twelve hundred revolutions per minute will permit the collar 20 to move upwardly until arrested by the ring 24 to thus effect a complete alignment of the aforementioned stops. During subsequent increase in speed of the propeller, due to the centrifugal torsion of the blades, the collar 21 will be moved rearwardly and stop 27 will engage stop 29 thereby limiting the lower pitch angle to a value slightly higher than that for take-off. The detent 33 will prevent any counterclockwise movement of the stop member 25 under these conditions. The stop 27 is preferably of such length as to result in a blade angle which is most efficient for top speed conditions of flight.

It will be readily understood that after engagement between stops 27 and 29, the next successive ratchet face will engage the pawl 32 and that subsequent movement of the collar 21 away from the hub, due to reduction in the speed of the propeller, will again adjust the stop member 25, in the manner described above and align stops 26 and 29. This particular adjustment is suitable for a cruising condition, it being apparent that when the said stops become engaged, the reduction in pitch will be less than for take-off or top speed conditions.
From the above, it will be apparent that the adjusting mechanism may be readily controlled by the operator and that a positive means is afforded for arresting the change in pitch of the blades at a value which will yield maximum propeller efficiency for the various conditions of flight. The operator may readily determine which one of the stops of variable length is aligned with the hub, by merely increasing the speed of the propeller and noting the highest speed obtained.

Referring to the thrust bearing construction 16, 17 and 18, the same comprises a novel arrangement affording increased bearing surface without increasing the diameter of the blade root or the hub sockets, or materially increasing the weight of the assembly and also without the necessity of employing excessively large ball bearings. As shown, Fig. 2, each of the bearings 16, 17 and 18 includes inner and outer races 35—36, 37—38 and 39—40 respectively. Each of these races is provided with right-angularly disposed bearing faces 41 and 42, the former being in engagement with the sides of the bearings, while the latter extend laterally inwardly between the bearings to engage the tops or bottoms thereof. All of the bearings are maintained in proper position within the hub sockets by means of a thrust ring 43 threadedly secured in the socket 7 and maintained in position by locking screws 44.

The construction of the bearings is such that each takes a proportion of the thrust load in accordance with the number of bearings employed. As shown, three bearings are utilized and, accordingly, each bears one-third of the entire thrust load, although it is to be understood that any number of bearings may be employed as desired. Since, however, the inner and outer races of the bearings are in contact with each other respectively, it is necessary that certain dimensions of the races be accurately determined in order that the above mentioned distribution of the thrust load of the blades will be obtained. To this end, a novel method is employed for simultaneously grinding cooperating pairs of races in order to insure that the required dimensions will be secured.

After the bearings have been initially formed and machined to a proper size, it is essential that for each pair of cooperating races, the dimensions a and b of the bottom races 35—36 be equal; the dimensions c and d and e and f of the intermediate races 37—38 be equal respectively; and the dimensions g and h of the top races 39—40 be equal in order that the three bearings disclosed may support the above mentioned portion of the total thrust load. For this purpose, blocks 45 and 46, see Figs. 3, 4 and 5, are provided on which the respective pairs of bearing races may be easily and readily assembled and held in place during the grinding process. As shown, Fig. 3, the top races 39 and 40 are assembled upon the block 45 with the laterally-extending bearing faces thereof in contact with the top surfaces of the races ground simultaneously along plane 50, thus insuring that the distance g will be equal to the distance h. Fig. 5 discloses the method of assembling the bottom races 35—36 on block 46, whereupon the surfaces of the races along plane 51 may be simultaneously ground so that the distances a and b will be equal. For grinding the intermediate races, the latter are assembled, as shown in Fig. 4, and are fitted separately into blocks 45 and 46. When block 45 is used, the top surfaces of the races on plane 52 are ground so that the distances c and d are equal, while when the block 46 is employed, the opposite faces of the races along plane 53 are ground in such a manner that the distance e will be equal to the distance f. After all races have been ground according to the above, they are assembled with the ball bearings in each hub socket and securely maintained in position by the thrust ring 43 as disclosed in Fig. 2.

It will be apparent from the above that there has been provided a novel and efficient propeller construction so arranged that the operator may readily control the limits of pitch variation of the blades by merely varying the speed of rotation of the propeller. The provision of the blade mounting disclosed affords an unusually rigid and secure structure for assembling the blades without the necessity of enlarging the root ends of the blades. The blade thrust bearing structure of the present invention and the method of assembling such structure produces an unusually compact and efficient bearing which is economical of manufacture and which is capable of withstanding unusually large thrust forces without danger of failure. By employing the novel method of simultaneously grinding the cooperating races of such bearing structure in pairs, an even distribution of the thrust load on the bearings is insured in a simple but efficient manner.

While only one embodiment of the invention has been herein disclosed and described, it is to be understood that various modifications may be made therein without departing from the spirit of the invention, as is well understood by those skilled in the art. Reference will, therefore, be had to the appended claims for a definition of the limits of the invention.

What is claimed is:

1. A variable pitch propeller comprising a rotatable shaft, a hub mounted on said shaft, a plurality of blades rotatably mounted in said hub, said hub being fixedly secured to said shaft, connections between said shaft and said blades for changing the angularity of the blades in response to the centrifugal torsion of the latter, said connections including a plate member slidably mounted on the shaft forwardly of the hub, resilient means interposed between the hub and plate for yieldingly resisting relative movement between the plate and hub, stop means carried by said plate for limiting such relative movement, said stop means including rotatable members having projections of varying lengths adapted for selective engagement with said hub, and connections between said hub and said rotatable members for turning said members through a predetermined arc upon movement of said plate away from said hub a predetermined extent.

2. A variable pitch propeller comprising a rotatable shaft, a hub fixedly secured to said shaft, a plurality of blades rotatably mounted in said hub, means operable in response to the centrifugal torsion of the blades for varying the pitch thereof, and means bodily adjustable axially of said shaft in response to change in pitch for variably positively limiting the latter.

3. A variable pitch propeller comprising a rotatable shaft, a hub fixedly connected to said shaft, a plurality of blades rotatably carried by said hub, means responsive to an operating condition of said propeller for varying the pitch thereof, said means including a member independent of said hub and surrounding said shaft and bodily movable axially thereof, and means adjustable in response to movement of said member in one direction for positively limiting its extent of movement in the other direction to limit the reduction in pitch of the blades.

4. A variable pitch propeller comprising a rotatable shaft, a hub fixedly secured to said shaft, a plurality of blades rotatably carried by said hub, a member slidably carried by said shaft and normally spaced from said hub, resilient means interposed between said member and hub, pitch-changing connections interconnecting said blades and member and operable in response to the centrifugal torsion of the blades to move said member toward said hub and vary the pitch of the blades, and stop means adjustable in response to movement of said member away from said hub for limiting the reduction in the pitch of the blades.

5. In a variable pitch propeller having a shaft, a hub fixedly secured thereto, and a plurality of blades rotatable about their longitudinal axes for changing the pitch thereof, means including a member surrounding said shaft and movable toward and away from the hub for effecting pitch-changing rotation of said blades, stop means for limiting operation of said pitch-changing means during a decrease in the pitch of the blades, and means operable upon movement of the pitch-changing means during an increase in the pitch of the blades for adjusting said stop means.

6. In a propeller having a shaft and a plurality of blades, means actuated by the centrifugal torsion of the blades for automatically varying the pitch of the blades, means for predetermining the extent of operation of said pitch-varying means within predetermined limits, and means including a member movable axially of said shaft and operated by said pitch-varying means for varying one of said limits.

MARTIN MANSSON.